United States Patent
Bulthaup et al.

(10) Patent No.: US 7,915,867 B1
(45) Date of Patent: Mar. 29, 2011

(54) SYNCHRONOUS CONTROL FOR GENERATOR OUTPUT

(75) Inventors: Colin Bulthaup, San Francisco, CA (US); John Lewis, San Francisco, CA (US); Michael O'Hara, San Francisco, CA (US)

(73) Assignee: Potenco, Inc., San Francisco, CA (US)

( * ) Notice: Subject to any disclaimer, the term of this patent is extended or adjusted under 35 U.S.C. 154(b) by 530 days.

(21) Appl. No.: 12/150,310

(22) Filed: Apr. 25, 2008

(51) Int. Cl.
 *H02P 9/10* (2006.01)
 *H02P 9/08* (2006.01)
(52) U.S. Cl. ............................................ 322/18; 322/45
(58) Field of Classification Search .................... 322/18, 322/22, 23, 24, 44, 45, 59
See application file for complete search history.

(56) References Cited

U.S. PATENT DOCUMENTS

| | | | | |
|---|---|---|---|---|
| 5,719,486 A * | 2/1998 | Taniguchi et al. | ............... | 322/28 |
| 5,723,973 A * | 3/1998 | Umeda et al. | .................. | 322/20 |
| 5,726,558 A * | 3/1998 | Umeda et al. | .................. | 322/27 |
| 5,936,312 A * | 8/1999 | Koide et al. | ................. | 290/40 R |
| 6,018,200 A * | 1/2000 | Anderson et al. | ........... | 290/40 B |
| 6,049,196 A * | 4/2000 | Arai et al. | ........................ | 322/61 |
| 6,346,797 B1 * | 2/2002 | Perreault et al. | ................ | 322/29 |
| 6,788,031 B2 * | 9/2004 | Pendell | ........................... | 322/44 |
| 6,803,748 B2 * | 10/2004 | Peter | .............................. | 322/29 |
| 7,471,004 B2 * | 12/2008 | Kanazawa et al. | .......... | 290/40 B |
| 7,541,784 B2 * | 6/2009 | Davis | ............................. | 322/22 |

* cited by examiner

*Primary Examiner* — Nicholas Ponomarenko
(74) *Attorney, Agent, or Firm* — Van Pelt, Yi & James LLP

(57) ABSTRACT

Synchronous control for an output of a generator is disclosed. A desired output level at the output of the generator is received. An off time to achieve the desired output level is determined. A timing for the off time is determined. One or more coil outputs are caused to switch off for the off time at the determined timing for the off time. The one or more coil outputs contribute to the output of the generator in the event that the one or more coil outputs are switched on.

19 Claims, 8 Drawing Sheets

SYNCHRONOUS CONTROL FOR GENERATOR OUTPUT

BACKGROUND OF THE INVENTION

When used to charge a battery or power a device, an electric generator may require regulation of its output. One approach is to turn on or off the output of the generator using a switch. However, one problem is that the current load in a generator coil is dumped depending on the way the output of the generator is turned on or off.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Synchronous control for a generator output is disclosed. One or more coil outputs contributing to the output of the generator are synchronously switched off from contributing when substantially no current is flowing from the one or more coils. One or more coil outputs contributing to the output of the generator are synchronously switched on to contribute appropriate amount to achieve a desired generator output.

In some embodiments, a desired output level at the output of the generator is received. An off time is determined to achieve the desired output level. A timing for the off time is determined. One or more coil outputs are switched off for the off time at the determined timing for the off time. The one or more coil outputs contribute to the output of the generator in the event that the one or more coil outputs are switched on. In various embodiments, the one or more coils comprise a subset or the entire set of coils associated with the generator.

Figure 1:
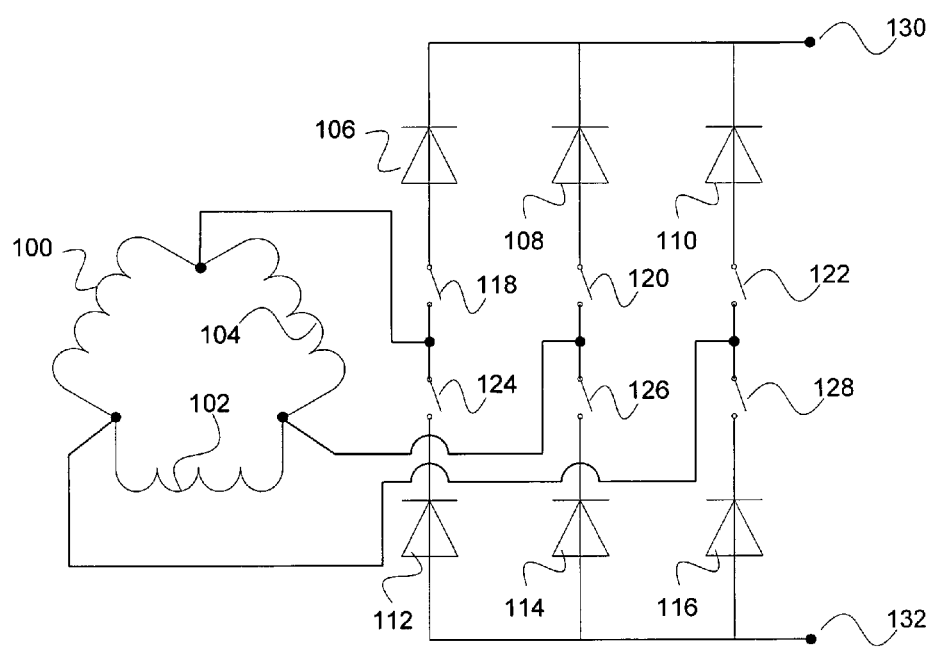
FIG. 1 is a circuit diagram illustrating an embodiment of a generator system with switches for controlling output.

FIG. 1 is a circuit diagram illustrating an embodiment of a generator system with switches for controlling output. In the example shown, coil 100, coil 102, and coil 104 are part of a generator. Generator coils (e.g., coil 100, coil 102, and coil 104) are moved with respect to magnetic fields such that currents are caused to move in the generator coils as a result of the motion. In some embodiments, generator coils remain stationary and magnetic fields produced by magnets are moved with respect to the generator coils such that currents are caused to move in the generator coils as a result of the motion. Generator coils are coupled to a set of diodes (e.g., diode 106, diode 108, diode 110, diode 112, diode 114, and diode 116) configured to rectify the output of the generator coils. Each switch in a set of switches (e.g., switch 118, switch 120, switch 122, switch 124, switch 126, and switch 128) is used to switch the output of the generator coils such that they contribute or do not contribute to the output of the generator. In some embodiments, not all switches shown in FIG. 1 are included. In some embodiments, a switch is located on the side of the diode between a diode and a connection node to a generator output (e.g., output 130 or output 132). Combinations of switch settings for the set of switches are used to achieve different generator output levels. For example, two switches are closed to complete the circuit— one from the upper set and one from the lower set, where the two switches are not in the same phase (e.g., switch 118 and switch 126, switch 118 and switch 128, switch 120 and switch 124, switch 120 and switch 128, switch 122 and switch 124, switch 122 and switch 126). In some embodiments, when two switches are closed to complete the circuit, the minimum power output is in the 33%-50% range depending on the nature of the load. In addition, each switch can be turned off and on during power generation to further adjust the generator output level. For example, during a portion of the time a coil is producing current, a switch can be set such that the output does not contribute to the generator output. In various embodiments, the generator is a human powered generator, a hand held generator, a portable generator, or any other appropriate generator.

Figure 2:
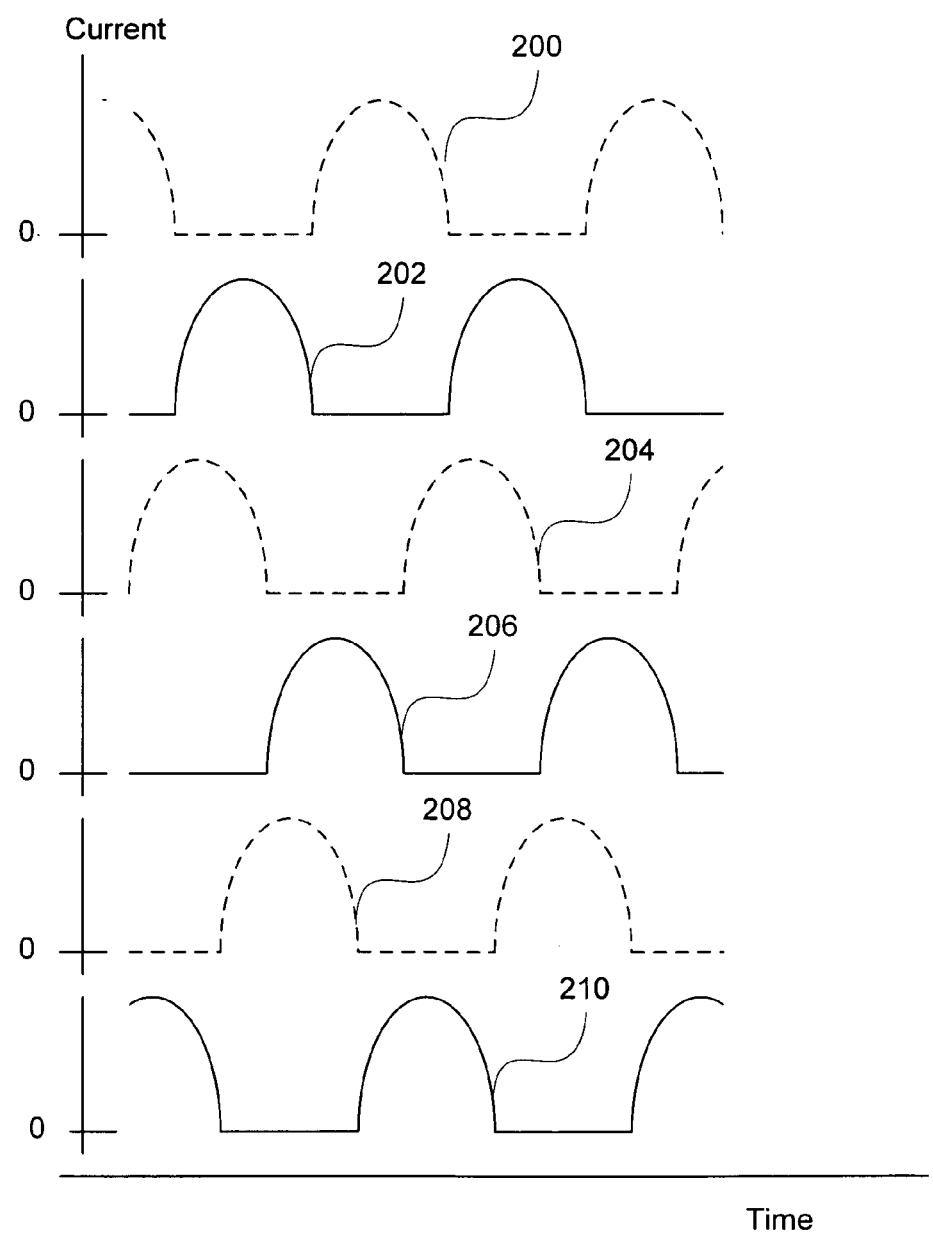
FIG. 2 are graphs illustrating outputs contributing to a generator output in one embodiment.

FIG. 2 are graphs illustrating outputs contributing to a generator output in one embodiment. In the example shown, the six traces of the graph (e.g., trace 200, trace 202, trace 204, trace 206, trace 208, and trace 210) represent current contributions to generator output. Each trace represents the current contribution flowing through a diode.

Figure 3A:
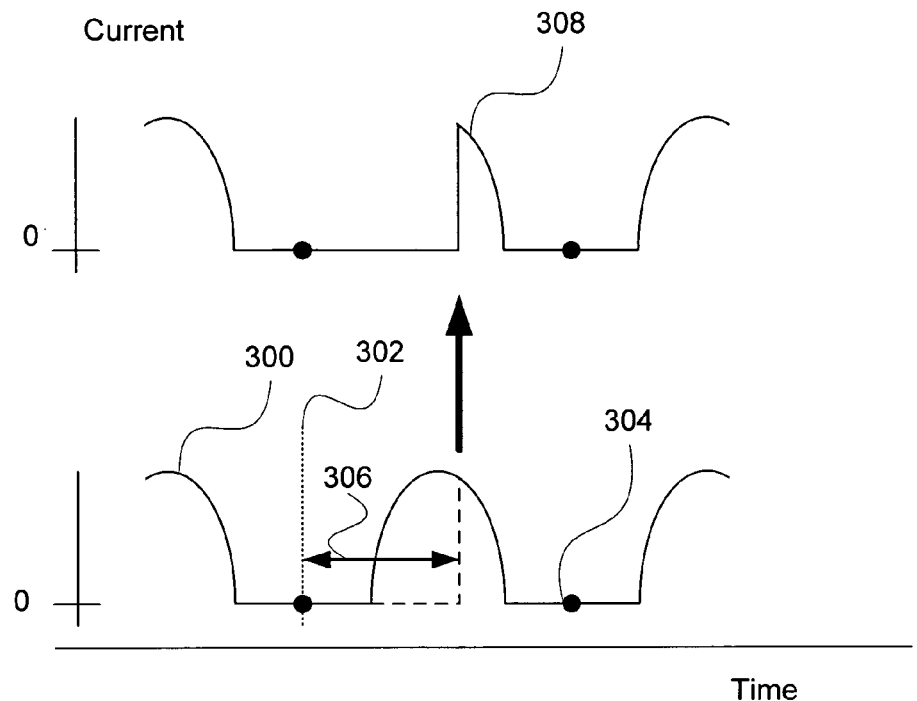
FIG. 3A are graphs illustrating output contributing to a generator output in one embodiment.

FIG. 3A are graphs illustrating output contributing to a generator output in one embodiment. In the example shown, trace 300 represents a current contribution from a diode connected to a generator coil to generator output. Point 302 and point 304 indicate times when a switch turns off the output contribution without causing problems (e.g., a load dump). Arrow 306 indicates an adjustable time during which a switch turns off the output contribution enabling adjustment of the output of the generator. Trace 308 represents an adjusted output contributing less current to the output of the generator. Because the switching of the output occurs at a point when there is no current flowing, there is not a problem such as the current rapidly dumping from a coil.

Figure 3B:
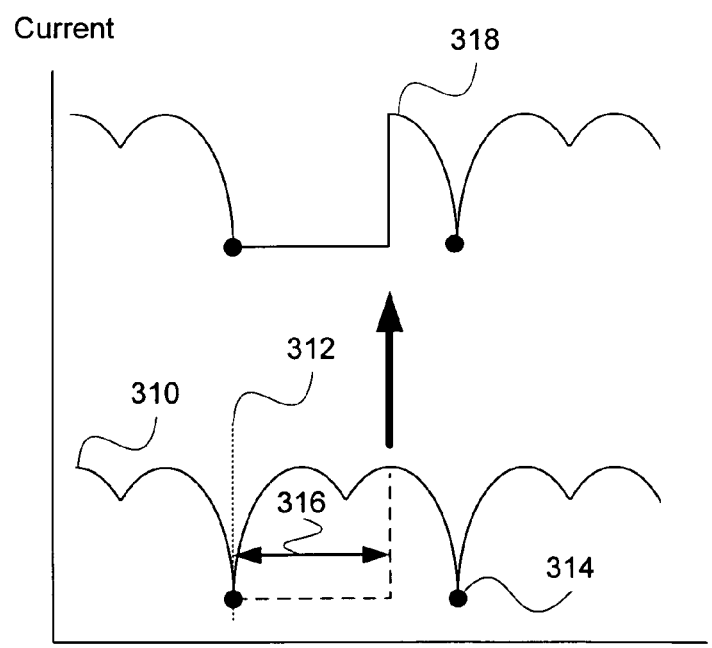
FIG. 3B are graphs illustrating output contributing to a generator output in one embodiment.

FIG. 3B are graphs illustrating output contributing to a generator output in one embodiment. In the example shown, trace 310 represents a current contribution from more than one diode (e.g., two diodes) connected to generator coils to generator output. Point 312 and point 314 indicate times when a switch turns off the output contribution without causing substantial problems (e.g., a load dump). Arrow 316 indicates an adjustable time during which a switch turns off the output contribution enabling adjustment of the output of the generator. Trace 318 represents an adjusted output contributing less current to the output of the generator. Because the switching of the output occurs at a point when there is substantially no current flowing, there is not a problem such as a substantial amount of current rapidly dumping from one or more coils.

Figure 4:
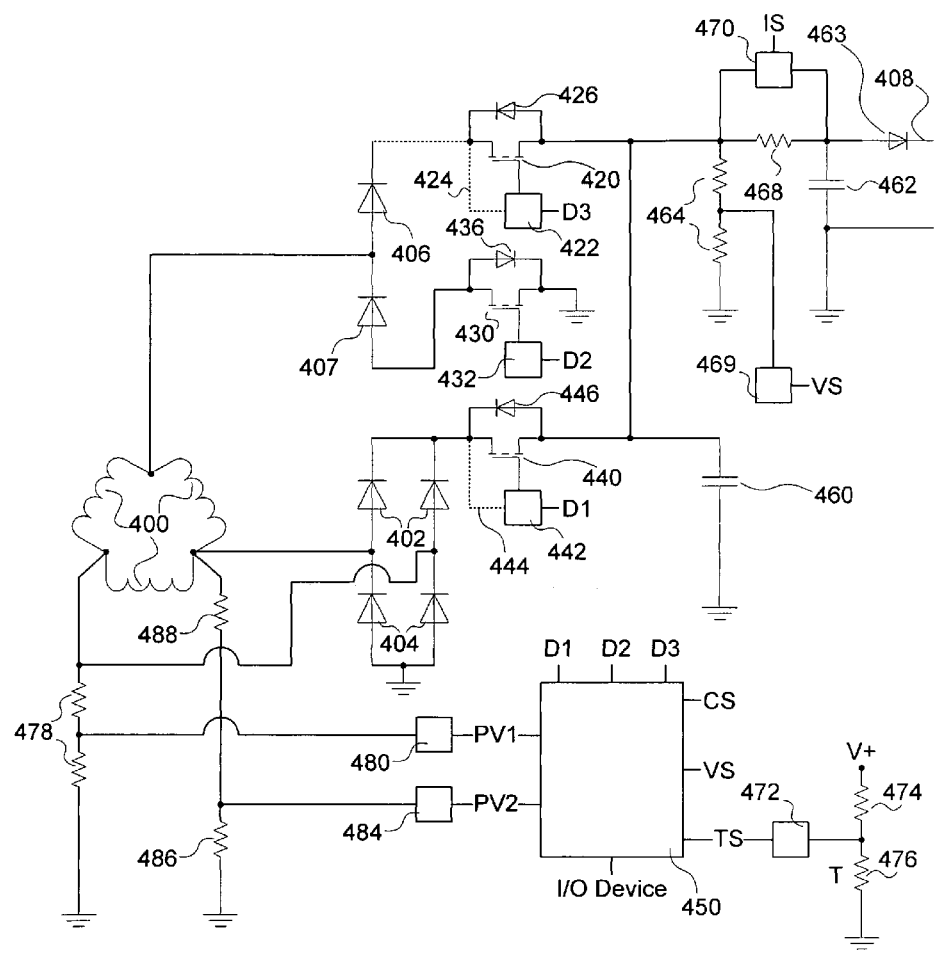
FIG. 4 is a circuit diagram illustrating an embodiment of a system for synchronous control of a generator output.

FIG. 4 is a circuit diagram illustrating an embodiment of a system for synchronous control of a generator output. In the example shown, generator coils 400 generate current flow in response to a magnetic flux change (e.g., due to the rotation of one or more permanent magnets around a set of fixed coils). Generator coils 400 are coupled to diodes 402, diodes 404, and diodes 406. The output from generator coils 400 going through diodes 402 and diodes 404 is ultimately coupled to generator output 408 when switch 440 is closed. Switch 440 is controlled using driver 442 and control signal D1. Control signal D1 is output by processor 450. Switch 440 has a protection diode 446. In some embodiments, monitor line 444 monitors input to switch 440, where the monitor signal is transmitted to processor 450 (Note the monitor signal is not shown in FIG. 4).

The output from generator coils 400 going through diode 406 is ultimately coupled to generator output 408 when switch 420 is closed. Switch 420 is controlled using driver 422 and control signal D3. Control signal D3 is output by processor 450. Switch 420 has a protection diode 426. In some embodiments, monitor line 424 monitors input to switch 420, where the monitor signal is transmitted to processor 450 (Note the monitor signal is not shown in FIG. 4).

The output going through diode 407 is coupled to ground when switch 430 is closed. Switch 430 is controlled using driver 432 and control signal D2. Control signal D2 is output by processor 450. Switch 430 has a protection diode 436.

The output from generator coils 400 going through switch 440 and switch 420 passes through blocking diode 463 after being coupled to capacitor 460 and capacitor 462. The output from generator coils 400 going through switch 440 and switch 420 is also measured: current value signal IS is measured using voltage measurer 470 (e.g., an analog to digital converter) across resistor 468 and voltage value signal VS is measured using resistor ladder 464 and voltage measurer 469 (e.g., an analog to digital converter). Current value signal and voltage value signal are passed to processor 450.

Temperature value signal TS is measured using voltage measurer 472 and resistor ladder 474 and 476, where resistor 476 has a temperature dependent resistance value. Generator coil value signal PV1 is measured using voltage measurer 480 and resistor ladder 478. Generator coil value signal PV2 is measured using voltage measurer 484 and resistor ladder formed by resistor 486 and resistor 488. Temperature value signal TS, generator value signal PV1, and generator value signal PV2 are passed to processor 450. Processor 450 is coupled to an input/output (I/O) device that is used to display output (e.g., output currents, voltages, temperatures, etc.) or to input set points (e.g., output current limits, voltage limits, temperature limits, etc.).

In some embodiments, components not critical to the operation of the generator or the control system are omitted (e.g., diode(s) such as blocking diode 463, capacitor(s) such as capacitor 462 and/or capacitor 460, temperature measurement circuitry, I/O device(s), switch(es) such as switch 430, etc.)

Figure 5:
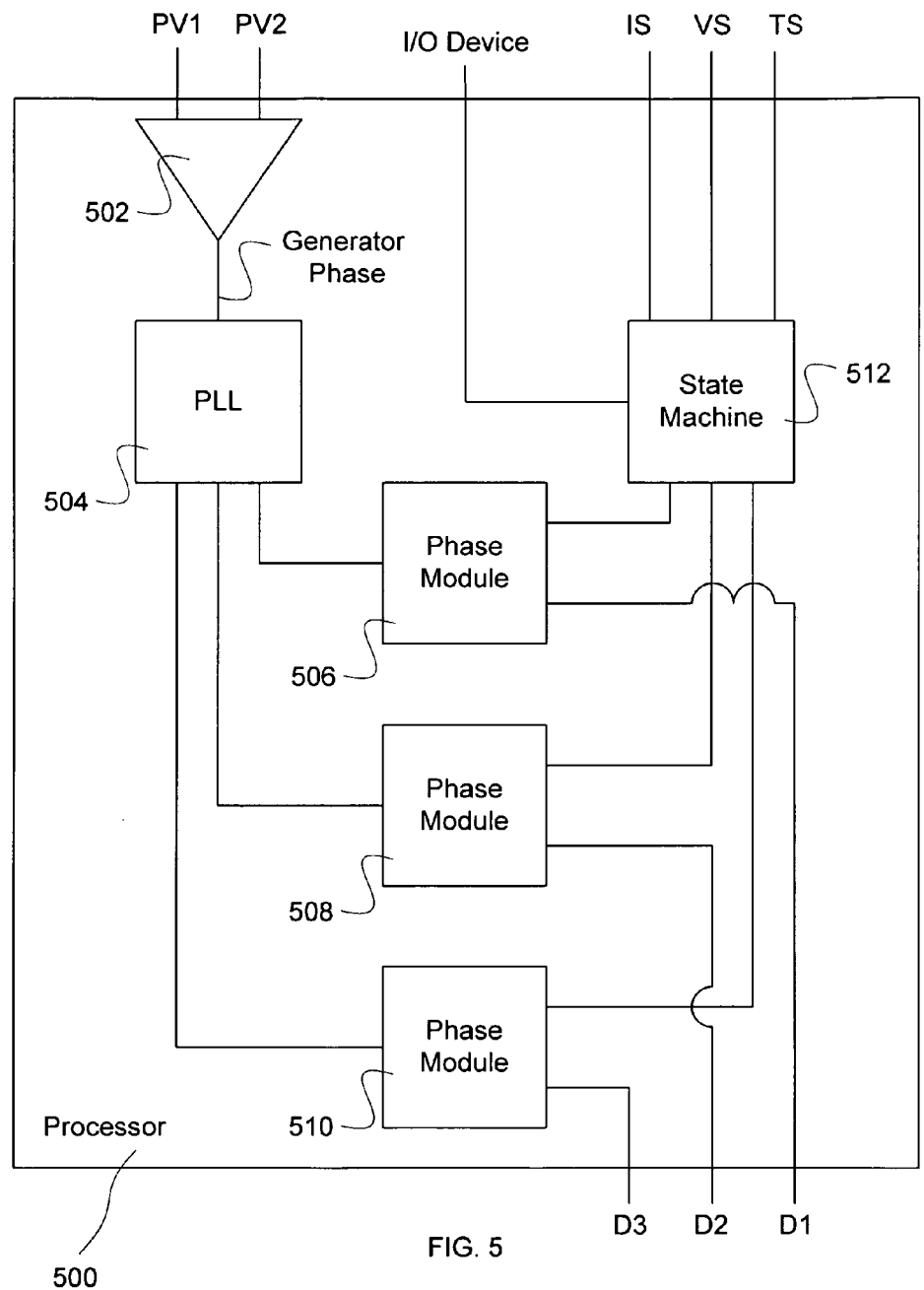
FIG. 5 is a block diagram illustrating an embodiment of a processor.

FIG. 5 is a block diagram illustrating an embodiment of a processor. In some embodiments, processor 500 of FIG. 5 is used to implement processor 450 of FIG. 4. In the example shown, processor 500 receives inputs PV1 and PV2 and compares these inputs using comparator 502 to obtain generator timing or generator phase information. The generator timing or phase information is used by phase lock loop (PLL) 504 to determine generator cycles, which are used to determine acceptable times to turn on/off switches associated with the generator coil or generator coil combinations. Phase module 506, phase module 508, and phase module 510 use generator timing cycles along with set point or limit information regarding voltages, currents, or temperature to determine switch on/off control signals D1, D2, and D3. State machine 512 receives current information (e.g., IS), voltage information (e.g., VS), and temperature information (e.g., TS) as well as current, voltage, and/or temperature set point(s) or limit(s) information (e.g., from I/O device). State machine 512 uses input information to indicate appropriate switch timings (e.g., on/off ratios) to phase modules (e.g., phase module 506, phase module 508, and phase module 510). State machine 512 indicates, by indicating switch on/off timings, the appropriate coil and/or combination of coils (e.g., because of the switch to coil association correspondence) to be used to achieve a desired output level. State machine 512 also can report set point or limit information as well as measurement information to I/O device for a user of the generator to see. In various embodiments, I/O device comprises one or more of the following: a display, one or more lights, one or more input switches, buttons, or toggles, a speaker, a microphone, a haptic sensor, a haptic output device (e.g., a vibration device), or any other appropriate input/output device.

In various embodiments, an I/O device is not provided for the generator and current, voltage, and/or temperature set points or limits are predetermined for the device or set using a predetermined algorithm or any other appropriate manner of setting the limits.

Figure 6A:
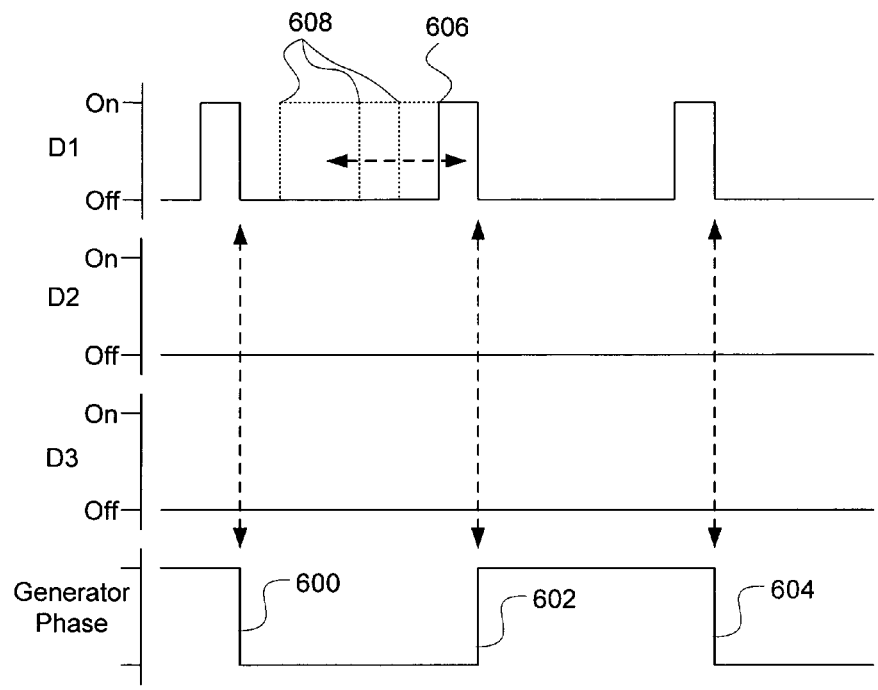
FIG. 6A are graphs illustrating switch control signals with respect to a generator phase in one embodiment.

FIG. 6A are graphs illustrating switch control signals with respect to a generator phase in one embodiment. In some embodiments, the signals in FIG. 6A are used to achieve a 0-66% output power from a system for synchronous control of a generator output such as shown in FIG. 4. In the example shown, the generator phase signal indicates no current flowing at times 600, 602, and 604 (e.g., generator phase as output from comparator 502 of FIG. 5 or corresponding to when PV1 and PV2 of FIG. 4 are equal in magnitude). Switch control signals D2 and D3 are set to be Off for all times shown in FIG. 6A. Switch control signal D1 indicates a turning off of switch at times corresponding to 600, 602, and 604 when it is acceptable to turn switch off (e.g., substantially no current flow or no current flow). Switch control signal D1 is turned on at a time (e.g., 606) determined to achieve the desired output power level or as appropriate given set point(s) or limit(s) associated with output current, output voltage, or generator temperature. Turn on time can be adjusted as appropriate as indicated by potential turn on times 608 in FIG. 6A.

Figure 6B:
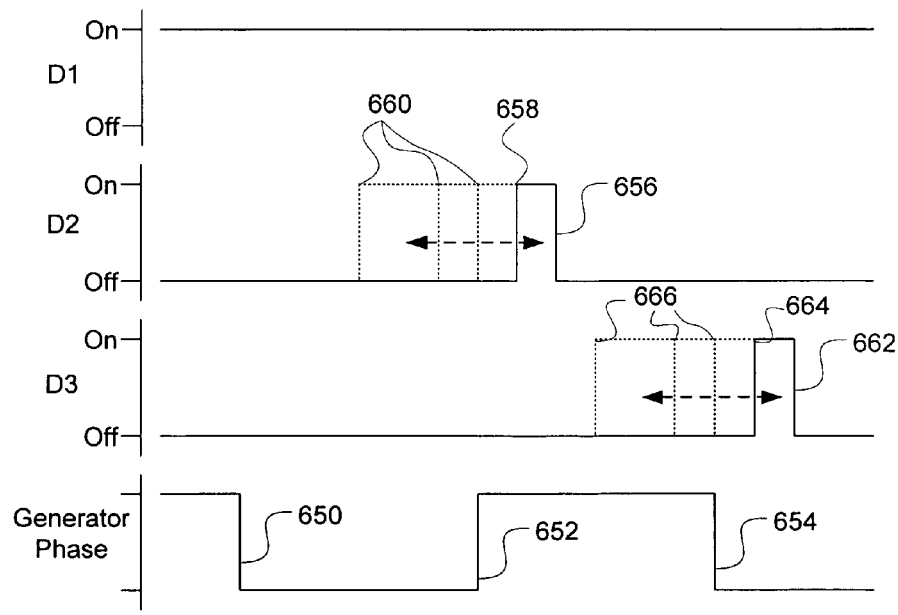
FIG. 6B are graphs illustrating switch control signals with respect to a generator phase in one embodiment.

FIG. 6B are graphs illustrating switch control signals with respect to a generator phase in one embodiment. In some embodiments, the signals in FIG. 6B are used to achieve a 66%-100% output power from a system for synchronous control of a generator output such as shown in FIG. 4. In the example shown, the generator phase signal indicates no current flowing at times 650, 652, and 654 in certain coil(s) of the generator (e.g., generator phase as output from comparator 502 of FIG. 5 or corresponding to when PV1 and PV2 of FIG. 4 are equal in magnitude). Switch control signal D1 is set to On for all times shown in FIG. 6B. Switch control signal D2 indicates an acceptable turning off of switch at time 656 based on generator phase signal information. Switch control signal D2 is turned on at a time (e.g., 658) determined to achieve the desired output power level or as appropriate given set point(s) or limit(s) associated with output current, output voltage, or generator temperature. Turn on time can be adjusted as appropriate as indicated by potential turn on times 660 in FIG. 6B. Similarly, switch control signal D3 indicates an acceptable turning off of switch at time 662 based on generator phase signal information. Switch control signal D3 is turned on at a time (e.g., 664) determined to achieve the desired output power level or as appropriate given set point(s) or limit(s) associated with output current, output voltage, or generator temperature. Turn on time can be adjusted as appropriate as indicated by potential turn on times 666 in FIG. 6B.

Figure 7:
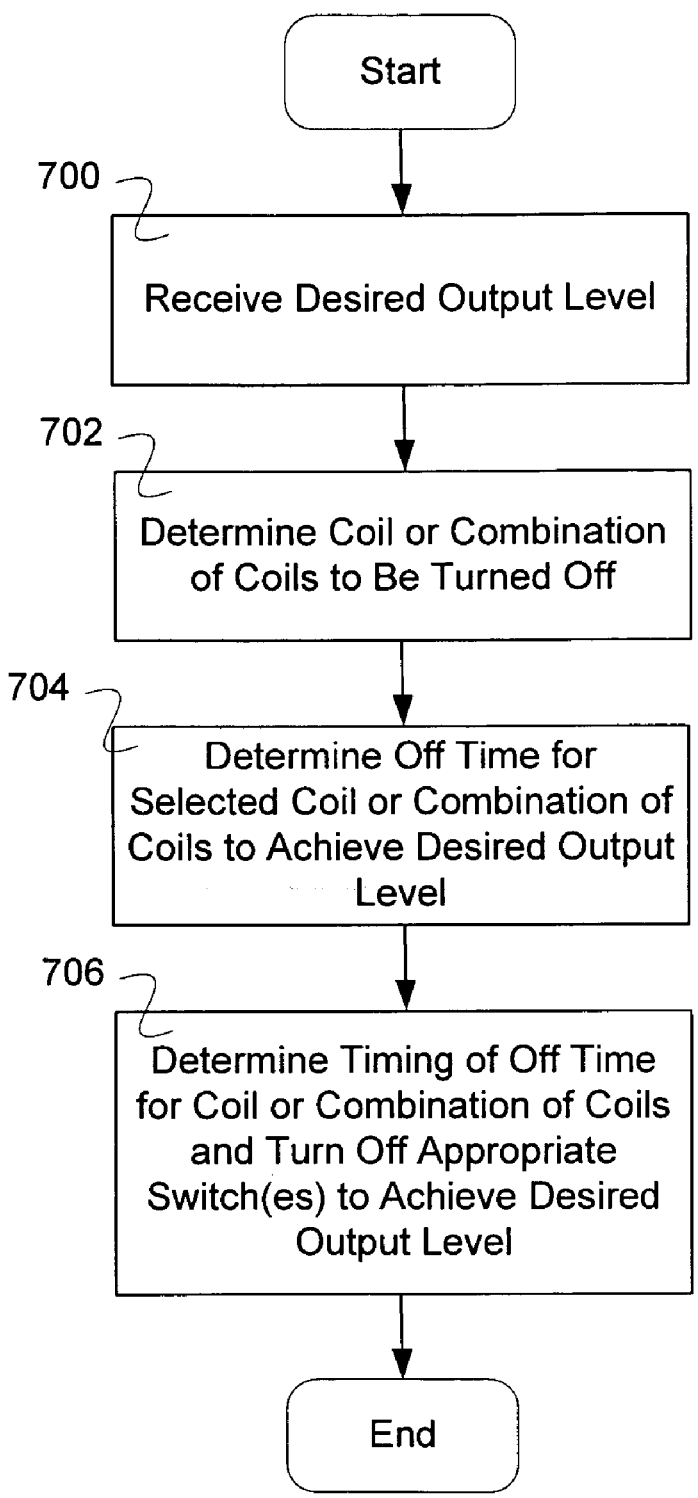
FIG. 7 is a flow diagram illustrating a process for synchronous control for generator output.

FIG. 7 is a flow diagram illustrating a process for synchronous control for generator output. In some embodiments, the process of FIG. 7 is executed in a processor such as processor 450 of FIG. 4 or processor 500 of FIG. 5. In the example shown, in 700 a desired output level is received. For example, a user enters a desired output level using an input output device on the generator unit. In some embodiments, a desired output level is predetermined or preset in the generator unit before a user receives the unit. In 702, the coil or coil combination of coils to be turned off is determined. For example, based on the desired output level and the configuration of the generator unit switches, a coil or combination of coils is selected to be turned on/off to achieve the desired output level. In various embodiments, there different ways of achieving different power levels using different combinations of switches for different coil(s) (e.g., switch(es) associated with one coil, all coils, a subset of coils, etc.) and timings and these can be determined as appropriate. In 704, the off time is determined for the selected coil or combinations of coils to achieve the desired output level. For example, the amount of time a given switch associated with a given coil or set of coils is set on, or off, is determined that will achieve the appropriate output level. In various embodiments, one or multiple switches are used to achieve the appropriate output level where a switch is associated with one or more diodes coupled to one or more corresponding generator coils. In 706, timing of the off time is determined for the coil or combination of coils and the appropriate switch(es) is/are turned off/on to achieve the desired output level. For example, the off (and on) times for each appropriate switch associated with each appropriate coil or combination of coils are determined and then executed to achieve the desired output level. Note that the times associated with the desired output level are overridden dependent on the set point(s) or limit(s), if any.

Figure 8:
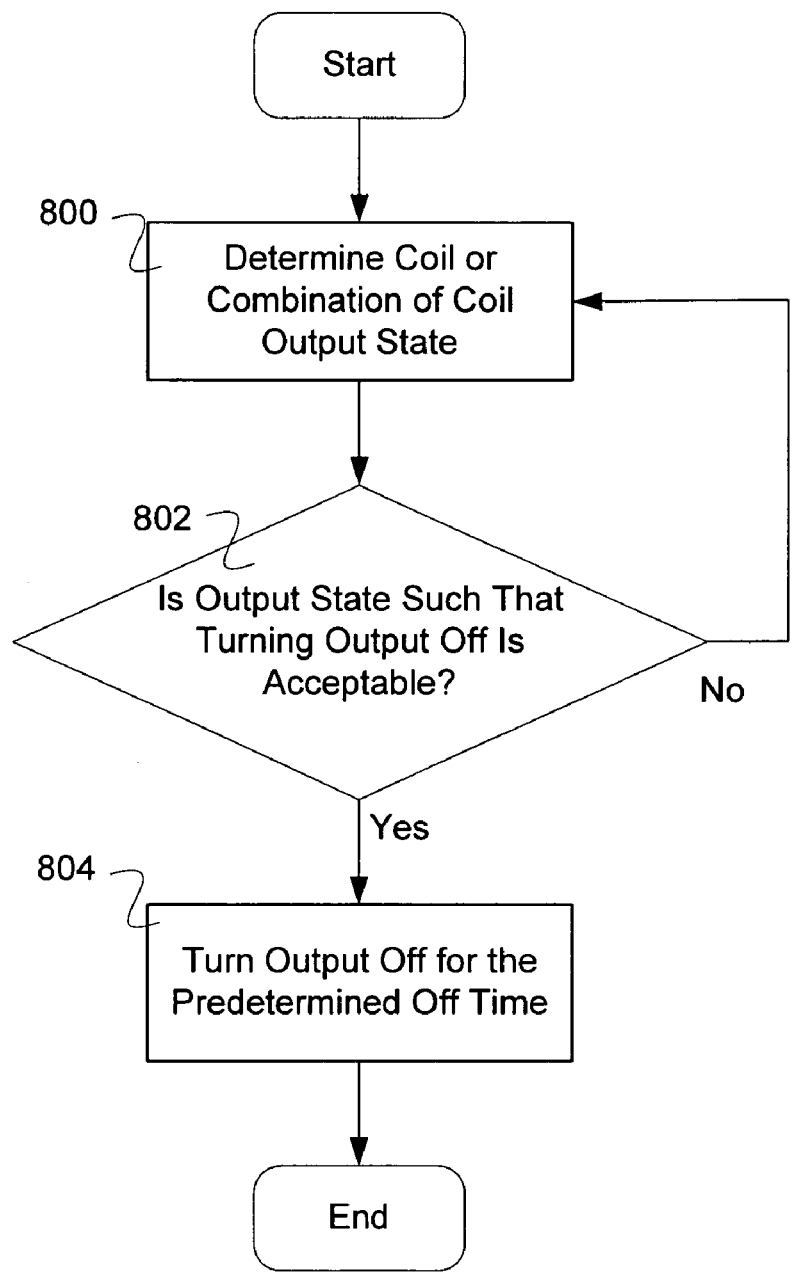
FIG. 8 is a flow diagram illustrating an embodiment of a process for determining timing and turning off switch(es) to achieve desired output level.

FIG. 8 is a flow diagram illustrating an embodiment of a process for determining timing and turning off switch(es) to achieve desired output level. In some embodiments, the process of FIG. 8 is used to implement 706 of FIG. 7. In the example shown, in 800 the coil or combination of coil output state is determined. For example, it is determined when, in the cycle of the generator timing, the current flowing out of the coil or the combination of coils is zero or substantially zero. In some embodiments, output from a detector of the cycle of the generator or phase of the power generation is input to a PLL to determine the generator cycle timing, and this information is used to determine appropriate timing for each appropriate switch setting and/or coil or combination of coil outputs. In 802, it is determined if the output state is such that turning the output off is acceptable. For example, the output state of the coil or combination of coils is acceptable in the event that zero or substantially zero current is flowing out of the coil or combination of coils. In some embodiments, substantially zero current flowing out of the coil or combination of coils is determined by determining acceptable dumping of current from coil or combination of coils for the generator system and/or circuits/batteries/loads/devices/equipment coupled to or potentially coupled to the generator system. In 804, output is turned off for the predetermined time. For example, the output from the coil or combination of coils is turned off using appropriate corresponding switch(es) so that the output contributes appropriately to the generator output such that the desired output for the generator is achieved. In some embodiments, the desired output comprises a user set output, a factory or manufacturer set output, a limited output, a set point output, or any other appropriate output.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for synchronous control for an output of a generator, comprising:
   receiving a desired output level at the output of the generator;
   determining an off time to achieve the desired output level;
   determining a timing for the off time; and
   causing one or more coil outputs to switch off for the off time at the determined timing for the off time, wherein one or more coil outputs contribute to the output of the generator in the event that the one or more coil outputs are switched on.

2. A method as in claim 1, further comprising determining the one or more coil outputs to turn off based at least in part on the desired output level.

3. A method as in claim 1, wherein the one or more coils comprise all coils of the generator.

4. A method as in claim 1, wherein the one or more coils comprise a subset of all coils of the generator.

5. A method as in claim 1, wherein determining a timing for the off time comprises:
   determining an output state of the one or more coils;
   determining whether the output state is such that turning the output off is acceptable; and
   in the event that it is acceptable to turn the output off, turning the output off for the off time.

6. A method as in claim 5, wherein the output state such that turning the output off is acceptable comprises a state wherein the one or more coils have no output current.

7. A method as in claim 5, wherein the output state such that turning the output off is acceptable comprises a state wherein the one or more coils have substantially no output current.

8. A method as in claim 5, wherein determining whether the output state is such that turning the output off is acceptable includes determining a generator cycle timing using a phase lock loop.

9. A method as in claim 1, wherein the generator comprises a human powered generator.

10. A system for synchronous control for an output of a generator, comprising:
   an interface for receiving a desired output level at the output of the generator;
   a state machine for determining an off time to achieve the desired output level;
   a phase module for determining a timing for the off time and for causing one or more coil outputs to switch off for the off time at the determined timing for the off time, wherein one or more coil outputs contribute to the output of the generator in the event that the one or more coil outputs are switched on.

11. A system as in claim 10, wherein the state machine determines the one or more coil outputs to turn off based at least in part on the desired output level.

12. A system as in claim 10, wherein the one or more coils comprise all coils of the generator.

13. A system as in claim 10, wherein the one or more coils comprise a subset of all coils of the generator.

14. A system as in claim 10, wherein determining a timing for the off time comprises:
   determining an output state of the one or more coils;
   determining whether the output state is such that turning the output off is acceptable; and
   in the event that it is acceptable to turn the output off, turning the output off for the off time.

15. A system as in claim 14, wherein the output state such that turning the output off is acceptable comprises a state wherein the one or more coils have no output current.

16. A system as in claim 14, wherein the output state such that turning the output off is acceptable comprises a state wherein the one or more coils have substantially no output current.

17. A system as in claim 14, wherein determining whether the output state is such that turning the output off is acceptable includes determining the generator cycle timing using a phase lock loop.

18. A system as in claim 1, wherein the generator comprises a human powered generator.

19. A computer program product for synchronous control for an output of a generator, the computer program product being embodied in a computer readable storage medium and comprising computer instructions for:
   receiving a desired output level at the output of the generator;
   determining an off time to achieve the desired output level;
   determining a timing for the off time; and
   causing one or more coil outputs to switch off for the off time at the determined timing for the off time, wherein one or more coil outputs contribute to the output of the generator in the event that the one or more coil outputs are switched on.

* * * * *